United States Patent
Noro et al.

[11] Patent Number: 6,094,021
[45] Date of Patent: Jul. 25, 2000

[54] MOTOR DRIVE APPARATUS

[75] Inventors: Yoshiki Noro; Yoshinobu Mukai; Shinzi Hironaka; Mitsunori Kawashima, all of Wako, Japan

[73] Assignee: Honda Giken Kogyo Kabushiki Kaisha, Tokyo, Japan

[21] Appl. No.: 09/413,066

[22] Filed: Oct. 6, 1999

[30] Foreign Application Priority Data

Nov. 12, 1998 [JP] Japan ................................. 10-322539

[51] Int. Cl.[7] .................................................. H02K 29/00
[52] U.S. Cl. .......................... 318/138; 318/254; 318/432; 318/434; 318/439; 361/23; 361/24; 361/31; 361/33; 361/87; 361/91
[58] Field of Search ..................................... 318/138, 254, 318/439, 432, 434; 361/23, 24, 31, 33, 87, 91

[56] References Cited

U.S. PATENT DOCUMENTS

| | | | |
|---|---|---|---|
| 5,111,123 | 5/1992 | Hach et al. | 318/434 |
| 5,552,684 | 9/1996 | Wada et al. | 318/293 |
| 5,786,679 | 7/1998 | Nishino et al. | 318/696 |
| 5,861,725 | 1/1999 | Endo et al. | 318/434 |
| 5,889,376 | 3/1999 | Takatsuka et al. | 318/434 |
| 5,932,979 | 8/1999 | Sun | 318/254 |
| 5,982,137 | 11/1999 | Endo | 318/812 |
| 6,013,994 | 1/2000 | Endo et al. | 318/432 |

Primary Examiner—Stanley J. Witkowski
Assistant Examiner—Edgardo San Martin
Attorney, Agent, or Firm—Merchant & Gould P.C.

[57] ABSTRACT

In a motor drive apparatus, a motor drive circuit includes an H bridge circuit composed of four field effect transistors or FETs, and resistors each having electrical resistance sufficiently higher than that of each of the FETs which would be presented when the FET has an ON-state trouble. These resistors are connected in parallel to the respective FETs. To perform a ON-state trouble detecting test on the individual FETs, an OFF signal is fed to all the FETs. If all the EFTS are free of the ON-state trouble, electric potential, representing a result of higher potential of a battery being divided by the resistors, appears at two input terminals of an electric motor connected to the motor drive circuit. If two of the FETs, having their drains connected to a higher-potential electrode of the battery, have the ON-state trouble, the higher potential of the battery appears at the two terminals of the electric motor. If the other two FETs, having their sources connected to a lower-potential or ground electrode of the battery, have the ON-state trouble, the lower or ground potential of the battery appears at the two terminals of the electric motor. These potential appearing at the motor terminals is detected via respective potential detectors.

2 Claims, 4 Drawing Sheets

MOTOR DRIVE APPARATUS

BACKGROUND OF THE INVENTION

1. Field of the Invention

The present invention relates generally to motor drive apparatus for controllably driving electric motors, and more particularly to an improved motor drive apparatus which includes a motor drive circuit with a bridge composed of four field effect transistors (hereinafter also referred to as "FETs") and is capable of reliably detecting presence or absence of an ON-state trouble in each of the FETs in the motor drive circuit.

2. Description of the Related Art

Among various types of the conventionally-known motor drive apparatus is the one which includes a motor drive circuit with a bridge composed of four FETs as typically illustrated in FIG. 5.

The illustrated bridge-type motor drive circuit 50 of FIG. 5 includes a total of four n-channel FETs Q1 to Q4. The first and second FETs Q1 and Q2 have their drains connected to the higher-potential or plus electrode of a battery Eo having a 12V capacity, for example, and the third and fourth FETs Q3 and Q4 have their sources connected to the lower-potential or minus (or ground commonly abbreviated "GND") electrode of the battery Eo. The source of the first FET Q1 and the drain of the third FET Q3 are connected with each other via a terminal M1, and similarly the source of the second FET Q2 and the drain of the fourth FET Q4 are connected with each other via a terminal M2. Electric motor 51 is connected between the terminals M1 and M2.

By activating or turning on the gate G1 of the first FET Q1 with a pulse-width-modulated (PWM) control signal and simultaneously turning-on the gate G4 of the fourth FET Q4, an electric current is caused to flow from the battery Eo, through the first FET Q1, terminal M1, motor 51, terminal M2 and fourth FET Q4, to the ground, so that the motor 51 is rotated in a forward direction; note that in order to thus rotate the motor in the forward rotation, it is also necessary for the gates G2 and G3 of the second and third FETs Q2 and Q3 to remain turned off.

Then, by activating or turning on the gate G2 of the second FET Q2 with a similar pulse-width-modulated (PWM) control signal and simultaneously turning on the gate G3 of the third FET Q3, an electric current is caused to flow from the battery Eo, through the second FET Q2, terminal M2, motor 51, terminal M1 and third FET Q3, to the ground, so that the motor 51 is rotated in a reverse direction; note that in order to thus rotate the motor the reverse rotation, it is also necessary for the gates G1 and G4 of the first and fourth FETs Q1 and Q4 to remain turned off.

Namely, with the motor drive circuit 50, the motor 51 is rotated in the forward or reverse direction by turning on the gate G1 of the first FET Q1 or the gate G2 of the second FET Q2 with the PWM control signal while, at the same time, turning on the gate G4 of the fourth FET Q4 or the gate G3 of the third FET Q3.

In the aforesaid conventional motor drive apparatus, a close check is made to see whether or not the four FETs Q1 to Q4 constituting the bridge circuit have an ON-state trouble, i.e., a short circuit.

More specifically, in the illustrated motor drive circuit 50 of FIG. 5, the "ON-state trouble check" on the four FETs Q1 to Q4 is made by detecting voltages of the motor 51 at the terminals M1 and M2 with the respective gates G1–G4 of all the FETs Q1 to Q4 turned off. Namely, in a situation where all the FETs Q1 to Q4 are in a normal operating condition (i.e., free of ON-state trouble or short circuit, a substantial zero voltage is detected at each of the terminals M1 and M2. However, even when the third or fourth FET Q3 or Q4 has the ON-state trouble, the zero voltage would be detected at each of the terminals M1 and M2 just as in the case where all the FETs Q1 to Q4 are in the trouble-free normal operating condition; thus, it has been impossible to accurately determine whether the third or fourth FET Q3 or Q4 is in the trouble-free normal operating condition or has the ON-state trouble.

Further, when the gate G1 of the first FET Q1 is turned on in the motor drive circuit 50 from a situation where all the gates G1–G4 of the first to fourth FETs Q1 to Q4 have been placed in the OFF state, a 12V voltage would be detected at each of the terminals M1 and M2. In this case, if the ON-state trouble occurs in the third or fourth FET Q3 or Q4 and an ON-state resistance of one of the malfunctioning third and fourth FETs Q3 and Q4 (i.e., resistance between the drain and source (drain-source resistance) of the third or fourth FET Q3 or Q4) is in the order of 1KΩ (the ON-state resistance in the normal operating condition is only tens of mΩ), then the 12V potential would appear at each of the terminals M1 and M2, making it impossible to appropriately distinguish between the case where the third or fourth FET Q3 or Q4 has the ON-state trouble and the case where the all the FETs Q1 to Q4 are in the trouble-free normal operating condition.

SUMMARY OF THE INVENTION

It is accordingly an object of the present invention to provide an improved motor drive apparatus which can reliably detect presence or absence of an ON-state trouble of each of a plurality of FETs constituting a bridge circuit therein.

According to one aspect of the present invention, there is provided an apparatus for controllably driving an electric motor, which comprises a battery, and a motor drive circuit including an input terminal connected with the battery and two output terminals connected with the electric motor. The motor drive circuit includes an H bridge circuit composed of four field effect transistors (FETs), and resistors each having electrical resistance higher than the electrical resistance of each of the FETs that would be presented when the field effect transistor has an ON-state trouble, the resistors being connected in parallel to at least two of the FETs, respectively. The motor drive apparatus of the present invention also comprises two potential detectors for detecting electric potential appearing at the two terminals of the electric motor. Presence or absence of the ON-state trouble can be detected for each of the FETs on the basis of the potential appearing at two input terminals of the electric motor.

Upon activation of the motor drive apparatus, an OFF signal is fed to all of the FETs constituting the H bridge circuit in the motor drive circuit. When all the FETs are free of the ON-state trouble, i.e., in the normal operating condition, electric potential, which represents a result of the higher potential of the battery being divided by the resistors connected in parallel to the two FETs, appears at the two terminals of the motor. When two of the FETs which have their respective drains connected to the higher-potential electrode of the battery have the ON-state trouble, the higher potential of the battery appears at the two terminals of the motor. Further, when the other two FETs which have their respective sources connected to the lower-potential (GND: ground) electrode of the battery have the ON-state trouble, the lower potential of the battery appears at the two terminals of the motor. Therefore, according to the present invention, presence or absence of the ON-state trouble of each of the FETs in the motor drive circuit can be identified accurately by the two potential detectors detecting the electric potential appearing at the two terminals of the motor.

Because each of the resistors connected in parallel to the corresponding FET has electrical resistance sufficiently higher than a known electrical resistance of each of the FETs that is presented when the FET has the ON-state trouble, the ON-state trouble can be detected accurately even in a situation where the FET having the ON-state trouble presents a high electrical resistance.

In one preferred implementation, an ON-state-trouble responding resistor is connected between the electric motor and the input terminal of the motor drive circuit. When the ON-state trouble is detected in any of the FETs through an ON-state-trouble detecting test, the ON-state-trouble responding resistor prevents an overcurrent from flowing through the motor drive circuit and the electric motor.

BRIEF DESCRIPTION OF THE DRAWINGS

Certain preferred embodiments of the present invention will be described in greater detail below, by way of example only, with reference to the accompanying sheets of drawings, in which.

DETAILED DESCRIPTION OF THE PREFERRED EMBODIMENTS

The following description is merely exemplary in nature and is in no way intended to limit the invention or its application or uses.

Figure 1:
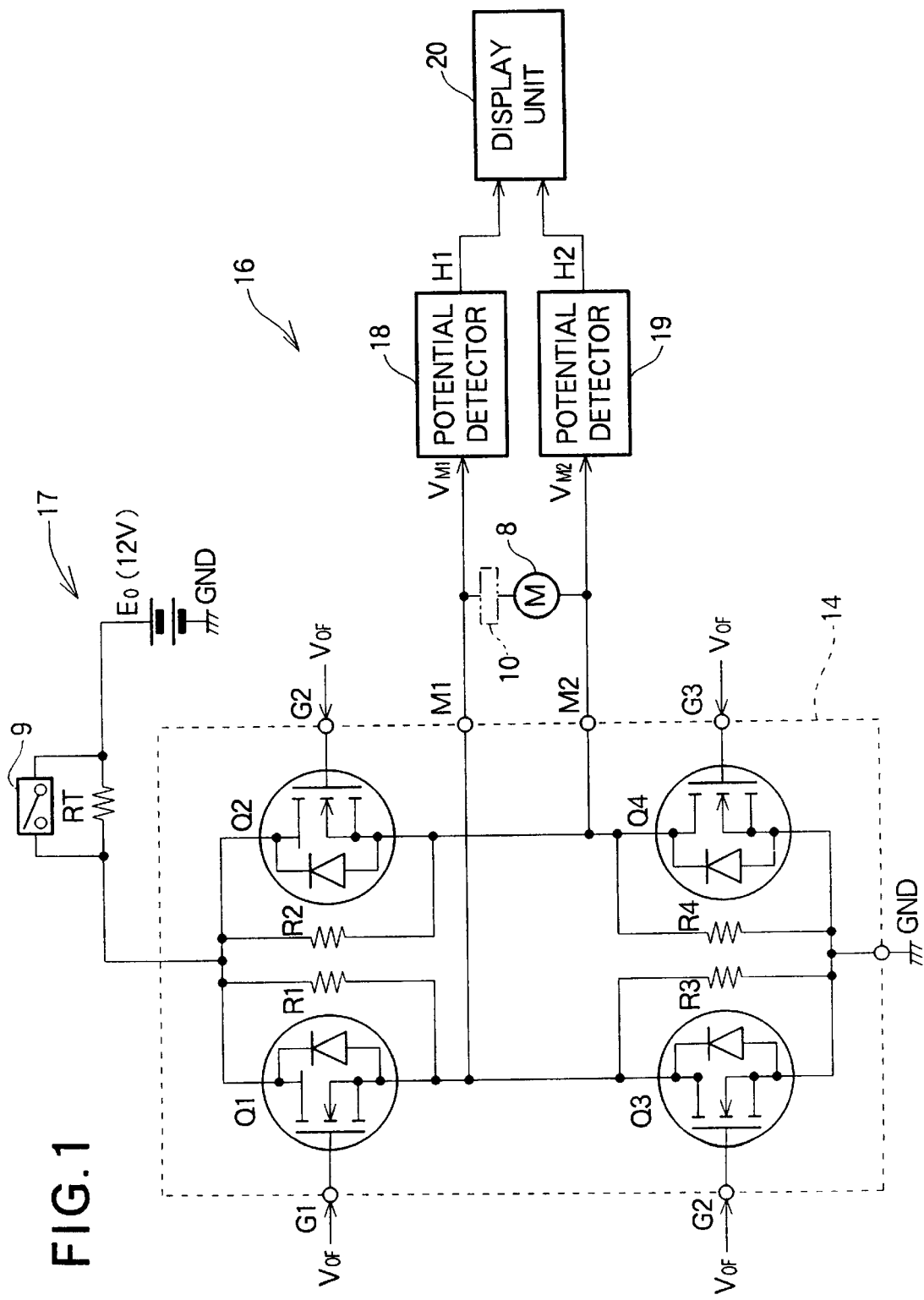
FIG. 1 is a block diagram showing a general organization of a motor drive apparatus in accordance with a preferred embodiment of the present invention.

FIG. 1 is a block diagram showing a general organization of a motor drive apparatus 17 in accordance with a preferred embodiment of the present invention, which includes a motor drive circuit 14, an ON-state-trouble identifying unit 16, an ON-state-trouble responding resistor RT and a battery Eo having, for example, a 12V capacity.

The motor drive circuit 14 is in the form of an H bridge circuit composed of four field effect transistors, i.e., first to fourth n-channel FETs. The motor drive circuit 14 has an input terminal connected to the 12V battery Eo. More specifically, the first and second FETs Q1 and Q2 have their drains connected to a higher-potential (+12V) electrode of the battery Eo via the ON-state-trouble responding resistor RT, and the third and fourth FETs Q3 and Q4 have their sources connected to a lower-potential(GND: 0V) electrode of the battery Eo.

Electric motor 8 is connected between output terminals of the motor drive circuit 14. Specifically, the source of the first FET Q1 is connected with the drain of the third FET Q3, and one terminal of the motor 8 is connected to a connecting point M1 between the source of the first FET Q1 and the drain of the third FET Q3. Further, the source of the second FET Q2 is connected with the drain of the fourth FET Q4, and another terminal of the motor 8 is connected to a connecting point M2 between the source of the second FET Q2 and the drain of the fourth FET Q4. Thus, the connecting points M1 and M2 function as the output terminals of the motor drive circuit 14.

The motor drive circuit 14 of FIG. 1 also includes resistors R1 to R4 provided in corresponding relation to the first to fourth FETs Q1 to Q4 and located between the drains and sources of the corresponding FETs Q1 to Q4, i.e., connected in parallel to the corresponding FETs Q1 to Q4. Each of the resistors R1 to R4 has electrical resistance, e.g., 100 KΩ, which is sufficiently higher than that of each of the FETs Q1 to Q4 that would be presented when the FET Q1–Q4 has an ON-state trouble.

To one of the terminals of the motor 8 is connected a first potential detector 18 for detecting electric potential $V_{M1}$ at the connecting point M1 between the source of the first FET Q1 and the drain of the third FET Q3. Similarly, to the other terminal of the motor 8 is connected a second potential detector 19 for detecting electric potential $V_{M2}$ at the connecting point M2 between the source of the second FET Q2 and the drain of the fourth FET Q4. Display unit 20 displays the ON-state trouble of each of the first to fourth FETs Q1 to Q4 which is identified on the basis of the potential at the points M1 and M2 (corresponding to the two terminals of the motor 8) detected via the first and second potential detectors 18 and 19. These first and second potential detectors 18 and 19 and display unit 20 together constitute the ON-state-trouble identifying unit 16 for detecting presence or absence of the ON-state trouble of each of the first to fourth FETs Q1 to Q4.

Because, as noted above, the resistors R1 to R4 are connected between the drains and sources of the corresponding FETs Q1 to Q4 in parallel relation thereto, the potential $V_{M1}$ at the connecting point M1, appearing when all the gates G1 to G4 are turned off by an OFF signal $V_{OF}$ fed from a control unit 13 (FIG. 4), amounts to 6V which represents a result of the 12V potential of the battery Eo being divided via the resistors R1 and R3 as long as all the FETs Q1 to Q4 are in the normal operating condition (i.e., free of ON-state trouble). Similarly, when all of the gates G1 to G4 are turned off by the OFF signal $V_{OF}$ fed from the control unit 13 and as long as all the FETs Q1 to Q4 are in the normal operating condition (free of ON-state trouble), the potential $V_{M2}$ appearing at the connecting point M2 amounts to 6V which represents a result of the 12V potential of the battery Eo being divided via the resistors R2 and R4.

Each of the first and second potential detectors 18 and 19 is provided with a trouble determination section. When the trouble determination sections determine, on the basis of the potential $V_{M1}$ and $V_{M2}$ detected at the connecting points M1 and M2, that the FETs Q1 to Q4 have the ON-state trouble, these determination sections supply the display unit 20 with trouble signals (e.g., high-level trouble signals) H1 and H2, respectively. Conversely, when the trouble determination sections determine, on the basis of the potential $V_{M1}$ and $V_{M2}$ detected at the connecting points M1 and M2, that the FETs Q1 to Q4 have no ON-state trouble, these determination sections supply the display unit 20 with low-level trouble signals H1 and H2, respectively.

The above-mentioned display unit 20 is a visual display such as light-emitting diodes (LEDs) or a liquid crystal display (LCD) and/or an audio display such as a speaker or buzzer. Thus, on the basis of the high-level trouble signals H1 and H2 supplied from the first and second potential detectors 18 and 19, the display unit 20 visibly and/or audibly informs presence of the ON-state trouble of each of the FETs Q1 to Q4 to a human operator or monitor.

The ON-state-trouble responding resistor RT has a low electrical resistance in the range of 100 Ω–1KΩ. This ON-state-trouble responding resistor RT, as shown in FIG. 1, is connected between the battery Eo and the motor drive circuit 14 and used in an ON-state-trouble detecting test upon activation of the FETs Q1 to Q4 as will be later described in detail. If the first FET Q1 and third FET Q3 or the first FET Q1 and fourth FET Q4 have simultaneously got into the ON-state trouble, or when the second FET Q2 and third FET Q3 or the second FET Q2 and fourth FET Q4 have simultaneously got into the ON-state trouble, the ON-state-trouble responding resistor RT functions to prevent an overcurrent from flowing through the first and second FETs Q1 and Q2 and motor 8, so as to protect the motor drive circuit 14 and motor 8. During operation of the motor 8, however, the ON-state-trouble responding resistor RT is short-circuited, for example, via a relay 9.

Now, a detailed description will be given about a manner in which presence or absence of the ON-state trouble of the FETs Q1 to Q4 is detected in the embodiment of the present invention. The ON-state-trouble detecting test of the first to fourth FETs Q1 to Q4 is performed by supplying the OFF signal $V_{OF}$ from the control unit 13 (FIG. 4) to the motor drive circuit 14, namely, to the respective gates G1 to G4 of the individual FETs Q1 to Q4. If all the FETs Q1 to Q4 are in the normal operating condition (free of ON-state trouble), the drain-source resistance of each of the FETs Q1 to Q4 remains considerably higher than the 100KΩ of the associated resistor R1–R4 (e.g., hundreds of MΩ), so that the potential $V_{M1}$ at the connecting point M1 assumes a value which represents a result of the 12V battery voltage being divided by the first and third resistors R1 and R3 (each having 100KΩ resistance) and similarly the potential $V_{M2}$ at the connecting point M2 assumes a value which represents a result of the 12V battery voltage being divided by the second and fourth resistors R2 and R4 (each having 100KΩ resistance). Because the resistance of the ON-state-trouble responding resistor RT is in the range of 100 Ω–1KΩ sufficiently lower than that of each of the resistors R1 to R4 and is hence safely ignorable, each of the potential $V_{M1}$ and potential $V_{M2}$ amounts to about 6V in this case.

If, however, the first FET Q1 or second FET Q2 has the ON-state trouble with the OFF signal $V_{OF}$ fed to the gates G1 to G4 of all the FETs Q1 to Q4, each of the potential $V_{M1}$ and potential $V_{M2}$ at the connecting points M1 and M2 amounts to about 12V, because the drain-source resistance of the first or second FET Q1 or Q2 is as low as tens of 10 mΩ–1KΩ and the respective drains of the first and second FETs Q1 and Q2 are connected to the higher-potential electrode of the battery Eo.

In the event that the third FET Q3 or fourth FET Q4 has the ON-state trouble with the OFF signal $V_{OF}$ fed to the gates G1 to G4 of all the FETs Q1 to Q4, each of the potential $V_{M1}$ and potential $V_{M2}$ at the connecting points M1 and M2 takes a 0V level, because the drain-source resistance of the third FET Q3 or fourth FET Q4 is as low as tens of 10 mΩ–1KΩ and the respective sources of the third and fourth FETs Q3 and Q4 are connected to the lower-potential (GND) electrode of the battery Eo.

TABLE 1 below shows relationship between the potential $V_{M1}$ and $V_{M2}$ at the connecting points M1 and M2 and determination as to presence/absence of the ON-state trouble of the FETs Q1 to Q4, where the terms "ON-state trouble" is abbreviated "ON Trouble" due to limited space.

TABLE 1

| | | | |
|---|---|---|---|
| $V_{M1}$(V) | 6 | 12 | 0 |
| $V_{M2}$(V) | 6 | 12 | 0 |
| Determination | Q1 to Q4 Normal | Q1 or Q2 ON Trouble | Q3 or Q4 ON Trouble |

As clear from TABLE 1, when the first and second potential detectors 18 and 19 have detected that the potential $V_{M1}$ and $V_{M2}$ at the connecting points M1 and M2 is each 6V, it is determined that all of the first to fourth FETs Q1 to Q4 are in the normal operating condition free of ON-state trouble.

When the first and second potential detectors 18 and 19 have detected that the potential $V_{M1}$ and $V_{M2}$ at the connecting points M1 and M2 is each 12V, it is determined that the first or second FET Q1 or Q2 has the ON-state trouble.

Further, when the first and second potential detectors 18 and 19 have detected that the potential $V_{M1}$ and $V_{M2}$ at the connecting points M1 and M2 is each 0V, it is determined that the third or fourth FET Q3 or Q4 has the ON-state trouble.

According to the described embodiment, however, when either one of the first and second FETs Q1 and Q2 has the ON-state trouble, it is very difficult to accurately determine which of the two FETs Q1 and Q2 has the ON-state trouble. This is because the electric motor 8 has a very low internal resistance (less than 1 Ω) and hence a little difference in electric potential between the two terminals. If the first FET Q1 has the ON-state trouble, for example, the potential $V_{M2}$ at the connecting terminal M2 becomes substantially equal to the potential $V_{M1}$ at the connecting terminal M1 associated with the malfunctioning FET Q1 due to the low internal resistance of the motor 8, which unavoidably makes it difficult or impossible to exactly identify a specific one of the two FETs Q1 and Q2 which has the ON-state trouble.

In case the electric motor 8 is rotated compulsorily during the ON-state-trouble detecting test in the embodiment, counterelectromotive force will occur in the motor 8 so that the potential $V_{M1}$ and $V_{M2}$ at the connecting points M1 and M2 varies accordingly. To deal with such an influence of the counterelectromotive force on the potential $V_{M1\ and\ VM2}$, an average voltage $V_{M3}$ between the potential $V_{M1\ and\ VM2}$ influenced by the counterelectromotive force may be calculated (i.e., $V_{M3}=(V_{M1}+V_{M2})/2$); this average voltage $V_{M3}$ can cancel out the counterelectromotive force. Thus, the use of the calculated average voltage $V_{M3}$ allows the ON-state-trouble detecting test to be executed without being influenced by the counterelectromotive force of the compulsorily-rotated motor 8.

Further, according to the embodiment of the present invention, a relay circuit 10 with a normally-closed contact may be connected between the output terminals M1 and M2 of the motor drive circuit 14 in series with the motor 8. By keeping the relay circuit 10 open or incomplete (i.e., by keeping the contact broken) throughout the ON-state-trouble detecting test, it is possible to avoid the influence of the counterelectromotive force caused by the compulsory rotation of the motor 8. Namely, with the relay circuit 10 kept incomplete throughout the ON-state-trouble detecting test, the motor 8 remains unconnected between the output terminals M1 and M2 of the motor drive circuit 14, which makes it possible to identify presence or absence of the ON-state trouble in each of the FETs Q1 to Q4.

In the case where only the first FET Q1 has the ON-state trouble with the OFF signal $V_{OF}$ fed to the gates G1 to G4 of all the FETs Q1 to Q4, the potential $V_{M1}$ appearing at the output terminal M1 amounts to about 12V that is substantially the same level as the higher potential of the battery Eo due to the fact that the drain-source resistance of the FET Q1 is as low as tens of mΩ–1KΩ. In this case, the potential $V_{M2}$ appearing at the other output terminal M2 amounts to about 6V which represents the result of the 12V battery voltage being divided by the second and fourth resistors R2 and R4 (each having 100KΩ resistance).

In the case where only the second FET Q2 has the ON-state trouble, the potential $V_{M1}$ appearing at the output terminal M1 amounts to about 6V which represents the result of the 12V battery voltage being divided by the first and third resistors R1 and R3 (each having 100KΩ resistance) and the potential $V_{M2}$ appearing at the other output terminal M2 amounts to about 12V that is substantially the same level as the higher potential of the battery Eo, in an opposite manner to the above-mentioned case.

Further, in the case where only the third FET Q3 has the ON-state trouble, the potential $V_{M1}$ appearing at the output terminal M1 takes a 0V level due to the fact that the drain-source resistance of the third FET Q3 is as low as tens of mΩ–1KΩ and the source of the FET Q3 is connected to the lower-potential (GND) electrode of the battery Eo. The potential $V_{M2}$ appearing at the output terminal M2, on the other hand, amounts to about 6V which is substantially equivalent to the result of the 12V battery voltage being divided by the second and fourth resistors R2 and R4 (each having 100KΩ resistance) as noted above.

Furthermore, in the case where only the fourth FET Q4 has the ON-state trouble, the potential $V_{M1}$ appearing at the output terminal M1 amounts to about 6V which represents the result of the 12V battery voltage being divided by the first and third resistors R1 and R3 (each having 100KΩ resistance) and the potential $V_{M2}$ appearing at the other output terminal M2 takes a 0V level due to the fact that the source of the FET Q4 is connected to the lower-potential (GND) electrode of the battery Eo, in an opposite manner to the above-mentioned case where only the third FET Q3 has the ON-state trouble.

TABLE 2 below shows relationship between the potential $V_{M1}$ and $V_{M2}$ at the output terminals M1 and M2 and determination as to the presence/absence of ON-state trouble of the FETs Q1 to Q4.

TABLE 2

| $V_{M1}$(V) | 12 | 6 | 0 | 6 |
|---|---|---|---|---|
| $V_{M2}$(V) | 6 | 12 | 6 | 0 |
| Determination | Q1 ON Trouble | Q2 ON Trouble | Q3 ON Trouble | Q4 ON Trouble |

As clear from TABLE 2, when the first potential detector 18 has detected that the potential $V_{M1}$ at the output terminal M1 is 12V and simultaneously the second potential detector 19 has detected that the potential $V_{M2}$ at the output terminal M2 is 6V, it is determined that the first FET Q1 has the ON-state trouble. It should be apparent that this determination is made by the ON-state-trouble identifying unit 16, in accordance with which the display unit 20 visibly and/or audibly informs that the first FET Q1 currently has the ON-state trouble.

When the first potential detector 18 has detected that the potential $V_{M1}$ at the output terminal M1 is 6V and simultaneously the second potential detector 19 has detected that the potential $V_{M2}$ at the output terminal M2 is 12V, it is determined that the second FET Q2 has the ON-state trouble and the display unit 20 visibly and/or audibly informs that the second FET Q2 currently has the ON-state trouble.

Further, when the first potential detector 18 has detected that the potential $V_{M1}$ at the output terminal M1 is 0V and simultaneously the second potential detector 19 has detected that the potential $V_{M2}$ at the output terminal M2 is 6V, it is determined that the third FET Q3 has the ON-state trouble and the display unit 20 visibly and/or audibly informs that the third FET Q3 currently has the ON-state trouble.

Furthermore, when the first potential detector 18 has detected that the potential $V_{M1}$ at the output terminal M1 is 6V and simultaneously the second potential detector 19 has detected that the potential $V_{M2}$ at the output terminal M2 is 0V, it is determined that the fourth FET Q4 has the ON-state trouble and the display unit 20 visibly and/or audibly informs that the fourth FET Q4 currently has the ON-state trouble.

Thus, by connecting the relay circuit 10 in series with the motor 8 and keeping the relay circuit 10 all through the ON-state-trouble detecting test, it is possible to exactly determine which of the FETs has the ON-state trouble.

Figure 2:
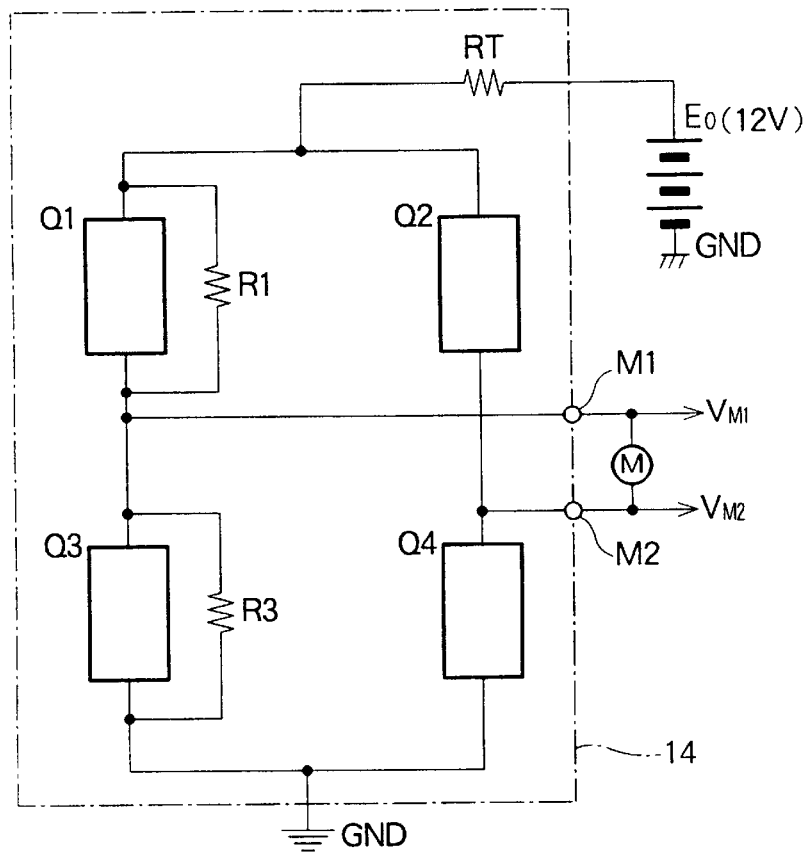
FIG. 2 is a block diagram illustrating a modification of a motor drive circuit shown in FIG. 1.
Figure 5:
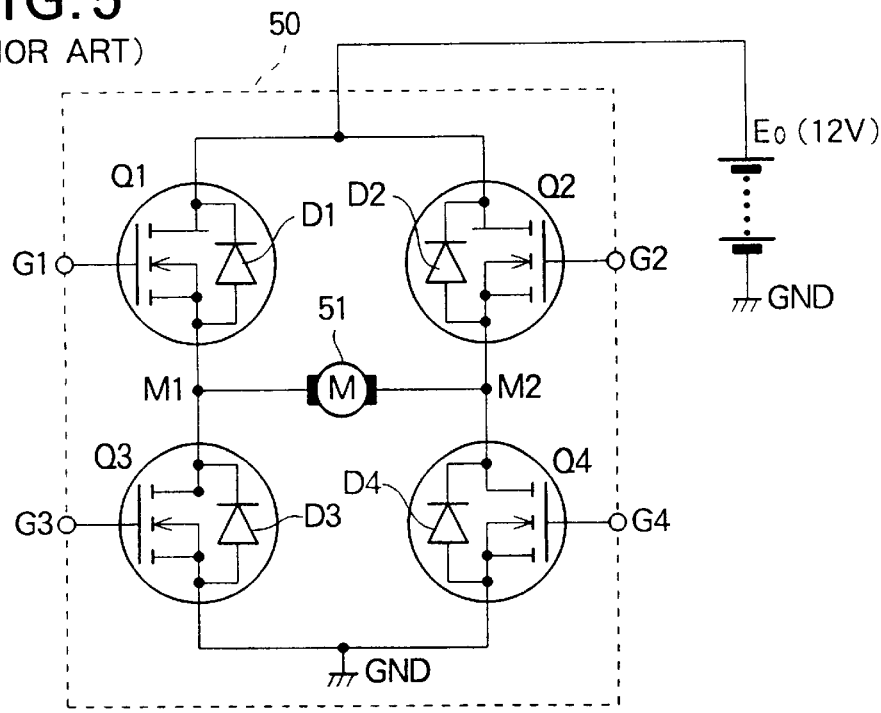
FIG. 5 is a block diagram of a conventional motor drive apparatus pertinent to the present invention.

FIG. 2 is a block diagram illustrating a modification of the motor drive circuit 14 shown in FIG. 1. In the modified motor drive circuit 14 of FIG. 2, the first and third resistors R1 and R3, each having a relatively high resistance of 100KΩ, are connected between the drain and source of the first FET Q1 and between the drain and source of the third FET Q3, respectively, taking into account the fact that the potential $V_{M1}$ and $V_{M2}$ appearing at the two output terminals M1 and M2 becomes substantially equal to each other due to the low internal resistance of the motor 8. Therefore, this modification is different from the embodiment of FIG. 1 in that the second and fourth resistors are omitted.

With the modified motor drive circuit 14 of FIG. 2 too, presence or absence of the ON-state trouble in each of the FETs Q1 to Q4 can be accurately determined through detection of the potential $V_{M1}$ and $V_{M2}$ appearing at the two output terminals M1 and M2 (corresponding to the two terminals of the motor 8) in the same manner as described earlier in relation to FIG. 1.

Figure 3:
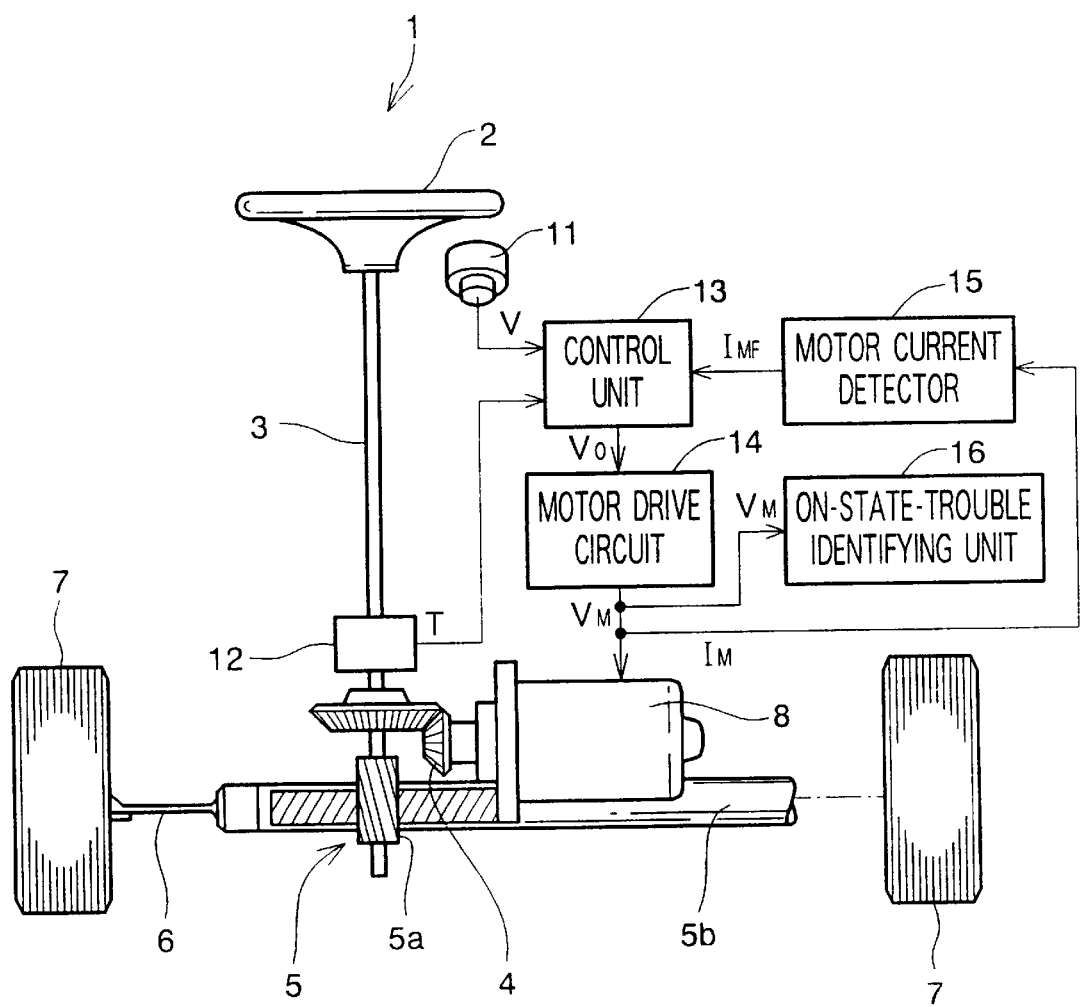
FIG. 3 is a diagram showing a general construction of an electric power steering apparatus for an automotive vehicle which employs the motor drive apparatus of the present invention.

FIG. 3 is a schematic diagram showing a general construction of an electric power steering apparatus 1 for an automotive vehicle which employs the motor drive apparatus of the present invention as detailed above in relation to FIG. 1.

In FIG. 3, the electric power steering apparatus 1 comprises, as principal mechanical components, a steering wheel 2, a steering shaft 3, a hypoid gear 4, a rack-and-pinion steering gear mechanism 5 including a pinion 5a and a rack shaft 5b, left and right steered front wheels 7 connected to opposite ends of the rack shaft 5b via tie rods 6, and an electric motor 8 for generating and supplying an electric steering assist to the vehicle steering system.

As principal electric components, the electric power steering apparatus 1 comprises a vehicle velocity sensor 11, a steering torque sensor 12, a control unit 13, a motor drive circuit 14, a motor current detector section 15 and an ON-state-trouble identifying unit 16.

The vehicle velocity sensor 11 detects a velocity of the automotive vehicle and generates a vehicle velocity signal V that is an electric signal representing the detected vehicle velocity. The steering torque sensor 12 detects steering torque applied to the steering wheel 2 and generates a steering torque signal T that is an electric signal representing the detected steering torque.

The control unit 13 of the steering apparatus generates a target motor current signal $I_{MS}$ on the basis of the steering torque signal T and vehicle velocity signal V, as well as a pulse-width-modulated (PWM) motor control signal $V_O$ corresponding to the target motor current signal $I_{MS}$. The motor drive 14 drives the electric assisting motor 8 with a motor voltage $V_M$, based on the motor control signal $V_O$ using the known PWM (Pulse Width Modulation) control technique. The motor current detector section 15 detects an actual motor current $I_M$ corresponding to the forward or reverse rotation of the motor 8 and generates a motor current signal $I_{MF}$ representing the detected actual motor current $I_M$. Upon activation of the motor drive apparatus, the ON-state-trouble identifying unit 16 detects presence or absence of the ON-state trouble in each of the four FETs that make up the H bridge circuit in the motor drive circuit 14 as described earlier in relation to FIG. 1.

As the vehicle driver turns the steering wheel 2 to the left or right, the manual steering torque applied to the steering shaft 3 is converted, via the rack-and-pinion steering gear mechanism 5, into an axial linear movement of the rack shaft 5b, which changes the direction of the front wheels 7 by way of the tie rods 6. To assist the driver's manual steering effort, the electric motor 8 is driven in response to the steering torque signal T, and output power or torque thus generated by the electric motor 8 is increased twofold via the hypoid gear 4 and then applied to the steering shaft 3 as electric steering assist torque to reduce the driver's manual steering effort.

Figure 4:
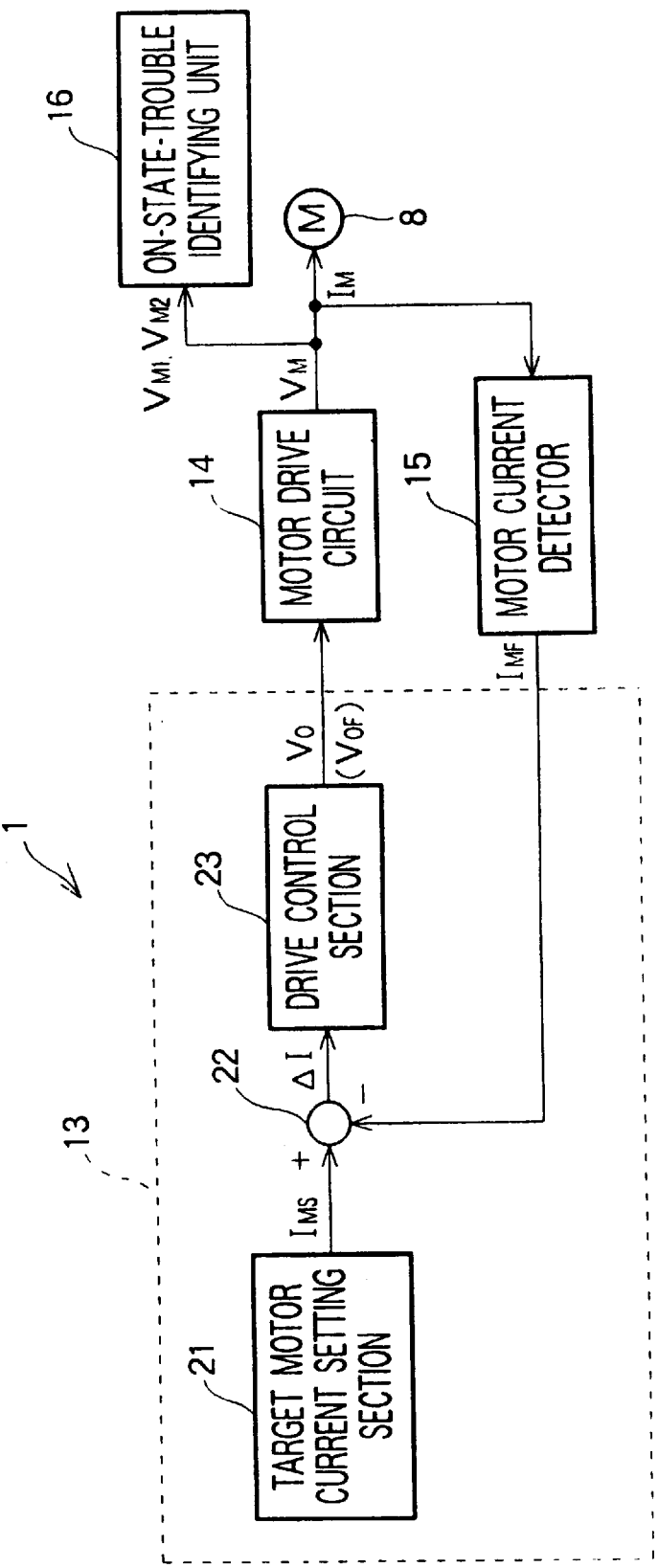
FIG. 4 is an electrical functional block diagram of the electric power steering apparatus shown in FIG. 3.

FIG. 4 is an electrical functional block diagram of the electric power steering apparatus 1 of FIG. 3. In FIG. 4, the electric power steering apparatus 1 includes the control unit 13, motor drive circuit 14, motor current detector section 15, ON-state-trouble identifying unit 16 and motor 8.

The control unit 13, which comprises a microprocessor and a memory, generates a target motor current signal $I_{MS}$ corresponding to the steering torque T and vehicle velocity V, as well as the motor control signal $V_O$ corresponding to a difference in value between the target motor current signal $I_{MS}$ and the motor current signal $I_M$. Then, the control unit 13 controls the motor drive circuit 14 in such a way that the difference in value between the target motor current signal $I_{MS}$ and the motor current signal $I_M$ (negative feedback) promptly becomes zero. Upon activation of the motor drive apparatus, the control unit 13 supplies the motor drive circuit 14 with the motor control signal $V_O$ that included the OFF signal $V_{OF}$ to be used for detecting presence or absence of the ON-state trouble in each of the four FETs constituting the H bridge circuit in the motor drive circuit 14.

The motor drive circuit 14, including the H bridge circuit composed of the four FETs Q1 to Q4 as shown in FIG. 1, generates the PWM motor voltage $V_M$ on the basis of the motor control signal $V_O$, so that the motor 8 is driven to rotate in the forward or reverse direction in response to the motor voltage $V_M$.

The motor current detector section 15 converts the actual motor current $I_M$ into voltage by means of a resistor, Hall effect device or the like connected in series with the electric motor 8, and sends the motor current signal $I_{MF}$, representing the actual motor current $I_M$, to the control unit 13 for negative feedback to the target motor current signal $I_{MS}$.

The ON-state-trouble identifying unit 16, which is constructed in the same manner as the one of FIG. 1, includes two potential detectors 18 and 19 for detecting electric potential at the two terminals of the motor 8, and a display unit 20 for visibly and/or audibly displaying the ON-state trouble of the FETs in the motor drive circuit 14 on the basis of the potential detected via the potential detectors 18, 19.

The control unit 13 further includes a target motor current setting section 21, an offset calculator section 22 and a drive control section 23.

The target motor current setting section 21 includes a memory, such as a ROM, which has prestored therein data indicative of a characteristic control curve of the target motor current signal $I_{MS}$ versus the steering torque T with vehicle velocities V as parameters. Upon receipt of the steering torque signal T from the steering torque sensor 12 and the vehicle velocity signal V from the vehicle velocity sensor 11, the target motor current setting section 21 reads out one of the prestored values of the target motor current signal $I_{MS}$ corresponding to the value of the received steering torque signal T and vehicle velocity signal V and then passes the read-out value to the offset calculator section 22.

The offset calculator section 22 computes a difference or offset $\Delta I$ between values of the target motor current signal $I_{MS}$ and the motor current signal $I_{MF}$ from the motor current detector section 15 (i.e., $\Delta I = I_{MS} - I_{MF}$), to generate an offset signal $\Delta I$. The offset signal $\Delta I$ is then supplied to the drive control section 23.

The drive control section 23, which includes a PID controller and a motor control signal generator, performs PID (Proportional, Integral and Differential) control operations on the offset signal $\Delta I$ supplied from the offset calculator section 22. Upon activation of the motor drive apparatus, this drive control section 23 feeds the OFF signal $V_{OF}$ to all the FETs constituting the H bridge circuit in the motor drive circuit 14. The drive control section 23 also generates the pulse-width-modulated motor control signal $V_O$ based on the PID control of the offset signal $\Delta I$, and feeds the thus-generated motor control signal $V_O$ to the motor drive circuit 14.

On the basis of the OFF signal $V_{OF}$ supplied from the drive control section 23 upon activation of the motor drive apparatus, the ON-state-trouble identifying unit 16 detects the ON-state trouble of each of the four FETs making up the H bridge circuit in the motor drive circuit 14 by detecting the potential $V_{M1}$ and $V_{M2}$ appearing at the two terminals of the motor 8, in the manner as described above in relation to TABLE 1.

Finally, whereas FIGS. 3 and 4 show the case where the motor drive apparatus of the present invention is applied to an electric power steering apparatus, the present invention is also applicable to rear wheel steering apparatus, variable-steering-ratio steering apparatus, electromotive vehicles, etc.

Obviously, various minor changes and modifications of the present invention are possible in the light of the above teaching. It is therefore to be understood that within the scope of the appended claims the present invention may be practiced otherwise than as specifically described.

What is claimed is:

1. An apparatus for driving an electric motor, comprising:
    a battery;
    a motor drive circuit including an input terminal connected with said battery and two output terminals connected with said electric motor, said motor drive circuit including an H bridge circuit composed of four field effect transistors and resistors each having electrical resistance higher than the electrical resistance of each of the field effect transistors that is presented when said field effect transistor has an ON-state trouble, said resistors being connected in parallel to at least two of the field effect transistors, respectively; and two potential detectors for detecting potential at two input terminals of said electric motor.

2. An apparatus as recited in claim 1 which further comprises an ON-state-trouble responding resistor connected between said electric motor and the input terminal of said motor drive circuit and wherein when an ON-state-trouble detecting test determines that any one of the field effect transistors has the ON-state trouble, said ON-state-trouble responding resistor prevents an overcurrent from flowing through said motor drive circuit and said electric motor.

* * * * *